United States Patent [19]

Habegger et al.

[11] 4,275,960
[45] Jun. 30, 1981

[54] SYSTEM FOR ENHANCED LIGHT UNIFORMITY IN A DOCUMENT SCANNING SYSTEM

[75] Inventors: Millard A. Habegger; Ross B. Hooker, III, both of Boulder, Colo.

[73] Assignee: International Business Machines Corporation, Armonk, N.Y.

[21] Appl. No.: 66,052

[22] Filed: Aug. 13, 1979

[51] Int. Cl.³ .................... G03B 27/52; G03B 27/80
[52] U.S. Cl. .................................. 355/68; 355/71
[58] Field of Search ............... 355/38, 68, 66, 8, 67, 355/41, 69–71; 356/404, 443, 444; 250/559–563

[56] References Cited

U.S. PATENT DOCUMENTS 3,698,815  10/1972  Thomas ........................... 355/68 X
4,067,640  1/1978   Shogren .......................... 355/66 X

*Primary Examiner*—L. T. Hix
*Assistant Examiner*—W. J. Brady

*Attorney, Agent, or Firm*—Fraser and Bogucki

[57] ABSTRACT

A system is disclosed in which a light beam from a light source is scanned over the surface of a document to be copied which is located at a nominal document position within the system. Light from the light beam is retro-scattered by the document, collected by a lens system and focused upon a detector. The intensity of the light impinging upon the detector is indicative of information contained upon the portion of the surface of the document being scanned. The system further includes aperture stops for limiting the solid angle of collection of retro-scattered light from a first position beyond the nominal document position from the lens system to a first predetermined angular value and for limiting the solid angle of collection of retro-scattered light from a second position between the nominal document position and the lens system to a second predetermined angular value.

5 Claims, 4 Drawing Figures

SYSTEM FOR ENHANCED LIGHT UNIFORMITY IN A DOCUMENT SCANNING SYSTEM

BACKGROUND OF THE INVENTION

This invention relates to office copying machines and, more particularly, to office copying machines utilizing document scanners in which an improved lens system is provided to enhance the uniformity of intensity of light reflected from the subject.

In some prior art office machines for making copies of documents, a light beam is scanned over a document and the light retro-scattered by the document is gathered by an optical system and directed to a light intensity detector. The detector measures intensity of the light to distinguish the information content in the document and controls the printing mechanism of the copier. Unfortunately, the manufacturing tolerances of the copying machine as well as variations in the position in which a document may be placed allow a document to drift from the point of optimum focus for the optical system. If this is the case, the illuminated portion of the document increases in size whether the document is nearer to or farther from the optical system than is the optimum focus point. The change in distance away from the lens system causes the collecting lens system to subtend different solid angles of collection at different document distances. Consequently, the intensity of light gathered from the same subject varies at different focusing distances.

In addition, in such a machine, the light beam is normally directed upon the document through a central hole in a mirror which also reflects the gathered light to the detector. The hole, in general, removes different amounts of reflected light at different document focusing distances and, consequently, further varies the intensity of the light reflected from the same subject matter at different focusing distances.

The intensity change caused by any of these variations is undesirable because the detection system cannot distinguish those changes from those caused by variations in the information contained in the document.

It is, therefore, an object of the present invention to provide a new and improved lens system for copy machines.

It is another object of the present invention to enhance the uniformity of the light intensity gathered from documents placed at different distances from the optimum focusing point in a document scanner.

It is another object of this invention to provide a light gathering system which subtends approximately the same solid angle of collection at focusing distances which are of practical consequence to a copying machine.

SUMMARY OF THE INVENTION

Briefly stated, a system is provided in which a light beam is scanned over the surface of a document which is to be copied. The document is located at a nominal document position within the system, and retroscatters light from the beam which is collected by a lens system and focused upon a detector. The intensity of the light impinging upon the detector is indicative of the information contained upon the portion of the surface of the document being scanned. In accordance with the invention, means are provided for limiting the solid angle of collection of retro-scattered light from a first position beyond the nominal document position from the lens system to a first predetermined angular value and for limiting the solid angle of collection of retro-scattered light from a second position between the nominal document position and the lens system to a second predetermined angular value. Normally, these two predetermined angular values are equal to each other, but in some instances, it may be desirable to make them somewhat different in value.

In accordance with one embodiment of the present invention, the means for limiting the solid angle of collection of retro-scattered light comprises an aperture stop positioned in the rear focal plane of the lens system. However, in some machines it is not always practical to place an aperture stop in the rear focal plane of the lens system. In such systems, and in accordance with the presently preferred embodiment of the invention, the means for limiting the solid angle of collection of retro-scattered light comprises a first aperture stop located between the nominal document position and the lens system and a second aperture stop located between the lens system and the detector. The first aperture stop has a diameter sufficient to limit the solid angle of collection of retro-scattered light from the first position to the first predetermined angular value. The second aperture stop has a diameter which limits the solid angle of collection of retro-scattered light from the second position to the second predetermined angular value.

BRIEF DESCRIPTION OF THE DRAWINGS

For complete understanding of the invention, together with an appreciation of its objects and advantages, please refer to the following detailed description of the attached drawings, in which.

DETAILED DESCRIPTION OF THE DRAWINGS

Figure 1:
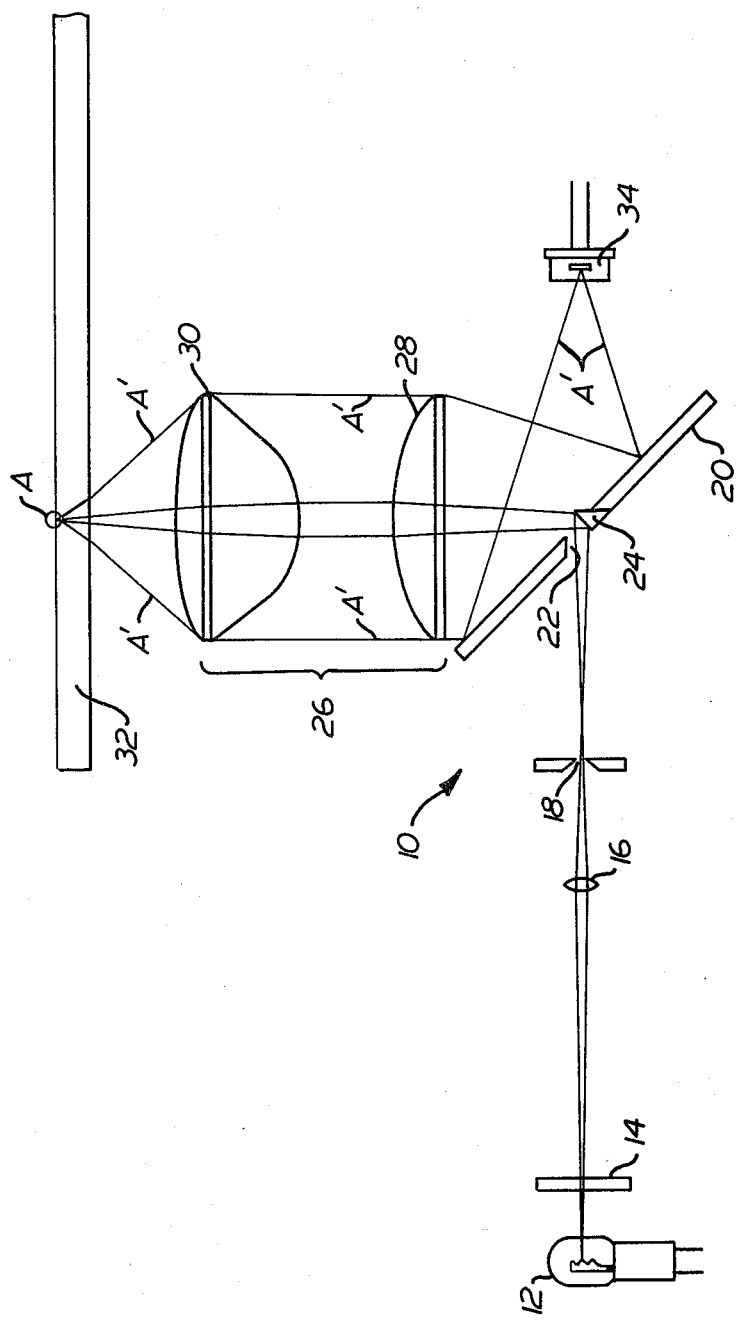
FIG. 1 is a diagrammatic view of a prior art document scanning system illustrating the principles of operation thereof.

In the following description of the drawings, the same reference numeral or letter is used to designate the same or corresponding parts in the various figures.

FIG. 1 shows a diagrammatic view of an optical detection system in accordance with the prior art which may be used in an office copying machine or the like. The particular optical detection system 10 shown in FIG. 1 is illustrated with a planar document window for ease of illustration. However, by positioning the lamp, lens and detection system within a rotating fixture, the system could be used in a concentric rotary scanning system.

Shown in FIG. 1 is a lamp 12 which generates a beam of light directed through a dichroic filter 14. The light which passes through the filter 14 is focused by a condenser lens 16 through an aperture 18 upon the center of a mirror assembly 20. The mirror assembly 20 has a central aperture 22 mounting a prism 24 which redirects the light beam from the lamp 12 through a lens system 26. In the particular lens system 26 shown in FIG. 1, a plano-convex lens 28 is arranged with an aspheric lens 30 to focus the beam of light upon the upper surface of a document window 30.

With a document on the upper surface of document window 32 in position A shown in FIG. 1, the light from the light beam is retro-scattered downwardly therefrom to be re-focused by the lens system 26 onto the upper mirror surface of the mirror assembly 20. The mirror assembly 20 re-directs the light reflected from the document onto a detector 34 which assesses the intensity of the light and thereby actuates means (not shown) for responding to the intensity to create a copy of the original document.

As may be seen in FIG. 1, the light focused upon the document on the upper surface of the document window 32 when that document is in the optimum focusing position (position A) is of minimal dimension and its cross section may be treated as a spot. This position may be termed the nominal document position. The extreme outer path of this light when scattered back through the lens system to the mirror assembly 20 and thence to the detector 34 is along the path A'. If, however, the document to be copied is positioned at some position other than the nominal document position because of the manufacturing tolerances of the machine containing the optical system 10 or because of buckling of the document or some other mispositioning of the document, then the light from the lamp 12 which is focusing on the document appears as an enlarged spot at the actual position of the document. Such light is still scattered downwardly from the document and travels towards detector 34.

This out of focus condition means that the illuminating spot size on the document increases and the light spot size on the detector 34 also increases. The amount of size increase in the illuminated spot is kept reasonable by using high f number optics. The detector area is made sufficiently large so that it collects all of the light for all reasonably expected out of focus conditions.

However, as the actual position of the document surface moves away from the nominal document position, which is the point of optimum focus, the total light falling on the detector 34 changes because the area of the aspheric collecting lens 30 subtends a different solid angle from the illuminated point on the document being copied. If the actual document position is beyond the nominal document position from the lens system, then this solid angle of collection of retro-scattered light becomes less, resulting in the collection of less retro-scattered light and lower output signal from the detector 34, which responds only to the intensity of the light upon it. Conversely, if the actual position of the document being copied is at some position between the nominal document position and the lens system, the area of the aspheric collecting lens 30 subtends a greater solid angle from the illuminated point on the document, and captures more retro-scattered light, resulting in more light being focused upon detector 34 and a greater output signal from the detector 34. This light power change is undesirable because the detector cannot distinguish this change from a change caused by scanned information on the document.

Figure 2:
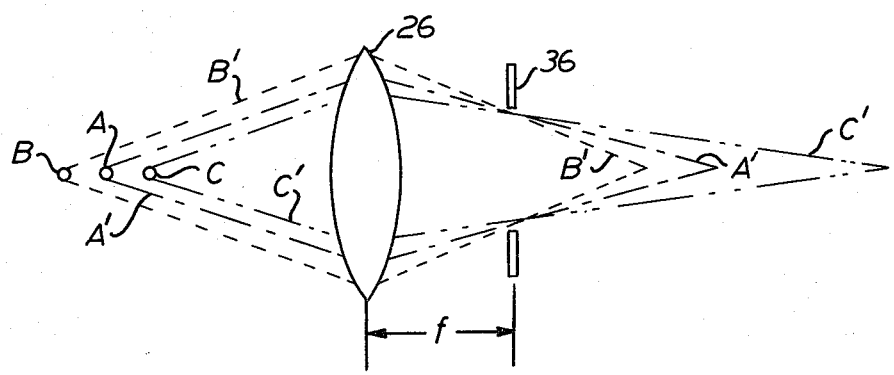
FIG. 2 is a schematic representation of a portion of a first embodiment of the present invention which provides a constant solid angle of collection of retro-scattered light for all positions in which the document being scanned might be placed.

However, in accordance with the present invention, this difficulty is overcome by arranging the lens system so that it accepts light scattered from any possible document position within acceptable limitations at the same or approximately the same maximum solid angle of collection of retro-scattered light. FIG. 2 is a schematic illustration of a first embodiment of the present invention. In FIG. 2, the lens system 26 has an aperture stop 36 positioned in its rear focal plane. FIG. 2 also illustrates a point A, which represents the nominal document position of FIG. 1, a point B which represents a first point on the axis of the lens system 26 which is beyond the nominal document position A from the lens system 26, and a point C which represents a second point on the axis on the lens system 26 which is between the nominal document position A and the lens system 26.

As is schematically represented by the light paths designated A', B' and C' in FIG. 2, the aperture stop 36 limits the maximum solid angle of collection of light of the lens system 26 to an equal angle for any of the positions A, B or C (or for any other position along the axis of the lens system 26, for that matter). Thus, regardless of the actual position of the document being scanned, the lens system 26 subtends an equal angle of collection of the retro-scattered light to provide uniform light intensity upon the detector 34 (not shown in FIG. 2).

However, in many systems, including the one shown in FIG. 1, the mirror assembly 20 is so positioned due to space limitations that it interferes with the placement of an aperture stop at the rear focal plane of the lens system as is shown in FIG. 2. Consequently, such an aperture stop cannot be so used in some machines.

Figure 3:
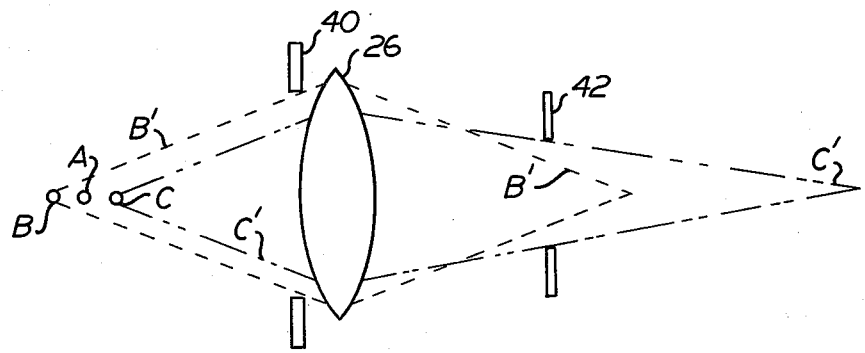
FIG. 3 is a schematic representation of a portion of a second, and the preferred embodiment of the present invention, and demonstrates the principles of operation thereof.

The principles of operation of a second, and the presently preferred embodiment of the invention which accomplishes the same result is schematically illustrated in FIG. 3. In FIG 3, a first aperture stop 40 is placed in front of the lens system 26 and a second aperture stop 42 is placed behind the lens system 26. The first aperture stop 40 has a diameter such as to limit the solid angle of collection of the rays from the furthest position B which might be expected and which would provide an acceptable imaging at the detector. The rays from position B describe a particular initial acceptance angle illustrated by path B' in FIG. 3 as that path proceeds to the lens. Rays proceeding from positions A and C both have a wider collection angle through the first aperture 40. However, the second aperture stop 42 placed after the lens system 26 has a diameter such as to limit the passage of rays from position C to those which have the same solid angle of collection. Thus, the path C' between position C and the lens 26 is parallel to the path B' from position B to the aperture 40, and the angle of collection for rays from positions B and C is identical, while the angle of collection for positions lying between positions B and C, including position A, varies only inappreciably therefrom. It should be noted that the aperture 42 must be placed beyond the crossing point for the outermost parallel rays from points B and C to accomplish this result. With an equal angle of collection for positions B and C and, for all practical matters, for positions therebetween, the intensity of light scattered by information of identical content at the different positions is substantially the same.

Figure 4:
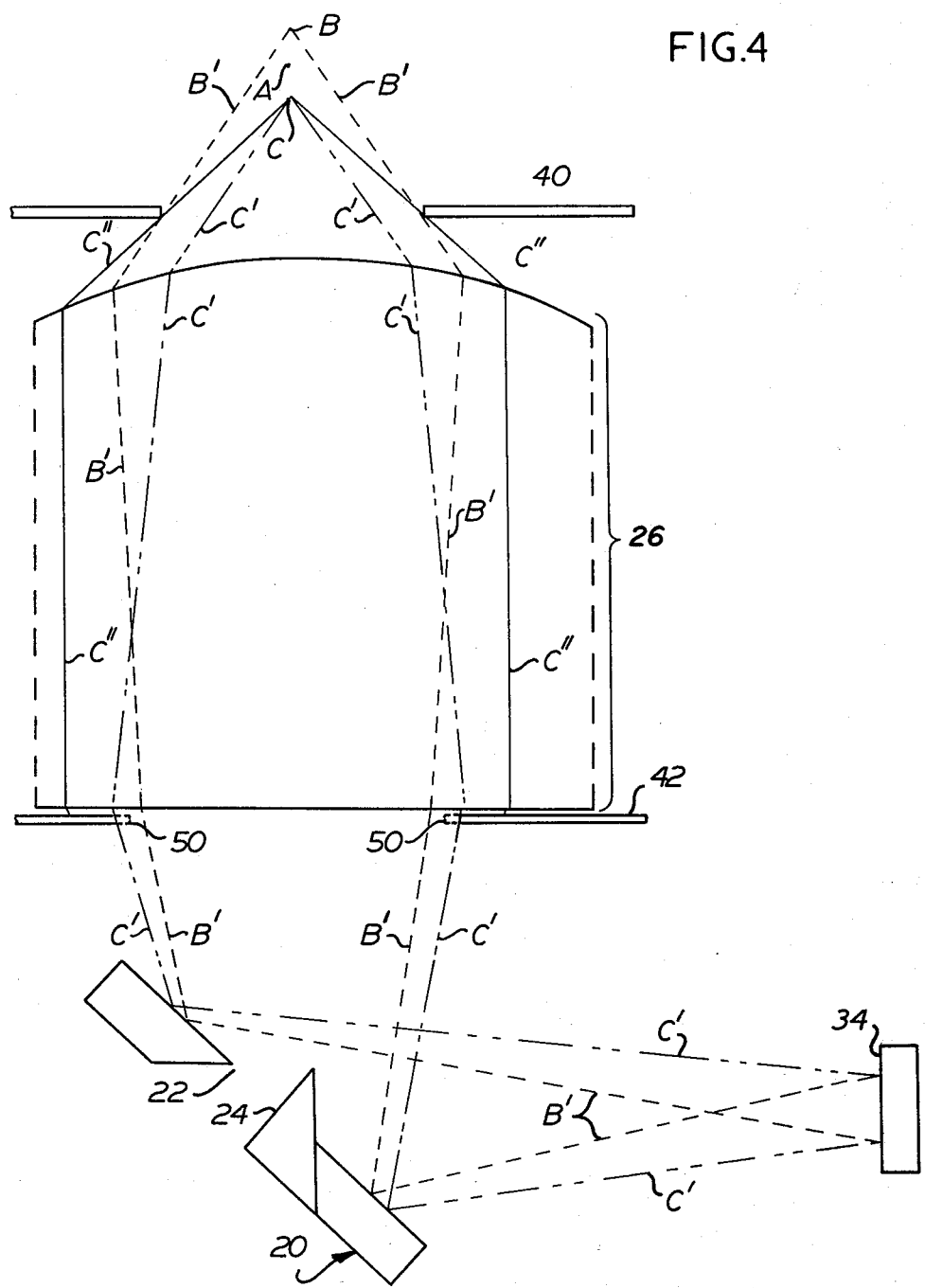
FIG. 4 is a diagrammatic view of a portion of the system of FIG. 1 and incorporating a presently preferred embodiment of the invention.

FIG. 4 illustrates an embodiment of the invention using aperture stops placed both in front of and behind the lenses of the lens system 26. For convenience, the lamp and focusing system for directing the light to the document window have been eliminated and only the refocusing elements have been shown. The arrangement includes lens system 26 arranged as in FIG. 1 to direct the light from the upper surface of the document window (not shown), and also illustrates positions A, B, and C which are the same positions shown in FIGS. 2 and 3. In FIG. 4, the lens system 26 is only shown generally. No attempt is made to show the specific lens elements or precise light ray paths, since these form no part of the present invention, and vary in different systems.

As may be seen in FIG. 4, a first aperture 40 is positioned between the lens system 26 and the document positions and restricts the rays from all of positions A, B, and C. This effectively restricts those rays directed from position B, which are constricted to the angle of collection. As may be seen, the rays B' passing from position B through aperture 40 are directed by the lens system 26 through a second aperture 42 positioned between the lens system 26 and the mirror assembly 20. As the rays B' passing through the lens system 26 from position B are more narrowly constricted, they all pass through the lower aperture 42 and are directed by the mirror assembly 22 to the detector 34 where they focus as a circle.

The actual size and position of the aperture stop 42 are selected so that rays C' proceeding from position C which are initially parallel to the outermost rays proceeding from position B passed by aperture 40 are just allowed to pass through the aperture 42. However, the rays C' from position C having a wider initial angle of collection are cut off at their outer edges by the aperture 42 so that the amount of light allowed therethrough is constrained, after reflection by the mirror assembly 22 to present an image at detector 34 which is a circle of approximately the same size as that projected from position B. Consequently, the lens system 26 and the apertures 40 and 42 define outermost angles of collection at positions B and C which are equal. Since the angles of collection from both of these positions are equal, the intensity of the light scattered from the two positions with an identical document is essentially identical. Furthermore, the light from all positions between position B and position C varies only slightly in collection angle from that at the two outermost positions, and thus presents only very small intensity differences at the detector 34.

In practice, it has been found that when the two aperture stop system of FIGS. 3 and 4 is omitted from the document scanning system of FIG. 1, variations in the intensity on the detector 34 are approximately 20% for a focal range of 1 millimeter centered on the point of optimum focus or the nominal document position. However, when the apertures 40 and 42 are inserted into the system, this variation in intensity has been cut to only 5%.

FIG. 4 also graphically illustrates yet a second cause of the change in intensity of light falling on detector 34 as the actual document position varies away from the nominal document position A towards either the first document position B away from the lens system 26 or towards the second document position C towards the lens system 26. The rays B' from the position B impinge upon a smaller portion of the upper mirror surface of the mirror assembly 20 than do the rays C' from the document position C, even though the apertures stops 40 and 42 limit the angle of collection from the two points to equal values. Since the size of the aperture 22 and the prism 24 of the mirror assembly 20 is constant, a higher percentage of the light collected from the position B is lost into the aperture 22 and upon the prism 24 than is the percentage of light collected from the position C lost through these same sources. Thus, the effect of this aperture 22 and prism 24 is greater for document positions which are outside of focus (or at the document position B) than is the effect for documents which are inside of focus (or at the document position C). In accordance with another embodiment of the invention, this greater loss of retro-scattered light may be compensated for by making the diameter of the aperture stop 42 somewhat smaller, as is shown by the dashed lines 50 in FIG. 4. This causes retro-scattered light from document position C to impinge upon less area of the upper mirror surface of mirror assembly 20 so that the effect of the aperture 22 and the prism 24 is equal for the two document positions B and C. However, this also restricts the angle of collection of light from the document position C so that less retro-scattered light from a document at that position passes through the aperture stop 42 to ultimately impinge upon the detector 34. This is a classic example of a design trade-off feature which a designer can optimize from any particular machine in which the invention is being utilized.

Obviously, the materials of which the arrangement of the present invention are constructed are those well-known to the art and would be obvious to anyone skilled therein. Furthermore, although the system described in FIGS. 2, 3, and 4 in its various configurations might be described as one which is optimum, it is obvious that particular apertures such as aperture 42 might vary in position and still accomplish the same constraining effect. For example, aperture stop 42 might be of a smaller dimension yet reside at a lower point along the path so long as it contrains rays from position C to those which are initially parallel to those proceeding from position B. In some machines it may be desirable to position aperture stop 42 between the mirror assembly 20 and the detector 34. Furthermore, a substantial effect in making light intensity more uniform would be accomplished even though the aperture stop 42 were not of the exact dimension necessary to constrain rays from positios B and C to be exactly parallel so long as the acceptance angles are made more parallel.

While there have been shown and described several embodiments of the invention, it is to be understood that various other adaptations and modifications might be made within the spirit and scope of the invention. It is intended that the invention be limited only by the appended claims.

What is claimed is:

1. In a system in which a light beam from a light source is scanned over the surface of a document or the like located at a nominal document position within the system, retro-scattered by the document, collected by a lens system and focused upon a detector and in which the intensity of the light impinging upon the detector is indicative of information contained upon the portion of the surface of the document being scanned, the improvement comprising:
   means disposed between the nominal document position and the lens system for limiting the solid angle of collection of retro-scattered light from a first position beyond the nominal document position from the lens system to a first predetermined angular value and means disposed between the lens system and the detector for limiting the solid angle of collection of retro-scattered light from a second position between the nominal document position and the lens system to a second predetermined angular value.

2. The invention of claim 1 in which the first and second predetermined angular values are equal.

3. The invention of claim 1 in which:
the means for limiting the solid angle of collection of retro-scattered light from a first position comprises a first aperture stop located between the nominal document position and the lens system and having a first predetermined diameter which limits the solid angle of collection of retro-scattered light from the first position to the first predetermined angular value; and
the means for limiting the solid angle of collection of retro-scattered light from a second position comprises a second aperture stop located between the lens system and the detector and having a second predetermined diameter which limits the solid angle of collection of retro-scattered light from the second position to the second predetermined angular value.

4. The invention of claim 3 in which the diameter of the first and second aperture stops are chosen such that the first and second predetermined angular values are equal.

5. The invention of claim 3 in which the light beam from the light source passes through an aperture in a mirror assembly prior to being focused upon the nominal document position by the lens system and in which the retro-scattered light is reflected by the mirror assembly onto the detector, in which the diameter of the second aperture stop is chosen to make the second predetermined angular value smaller than the first predetermined angular value to compensate for the greater loss of retro-scattered light from the first position through the aperture in the mirror assembly.

* * * * *